June 9, 1931.  H. HALPERIN ET AL  1,809,591
SHEATH BONDING AND METHOD
Filed Nov. 30, 1927
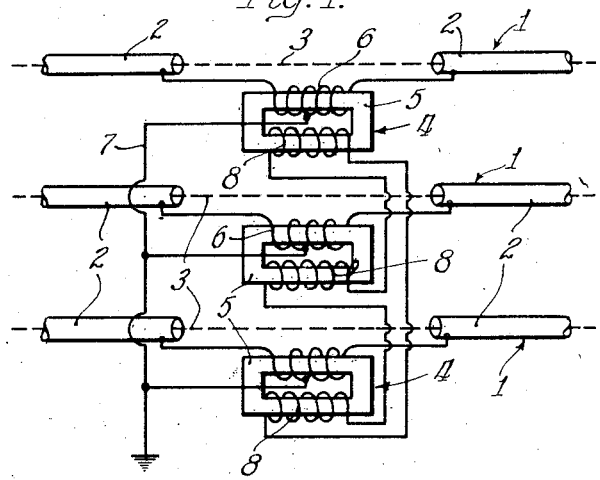
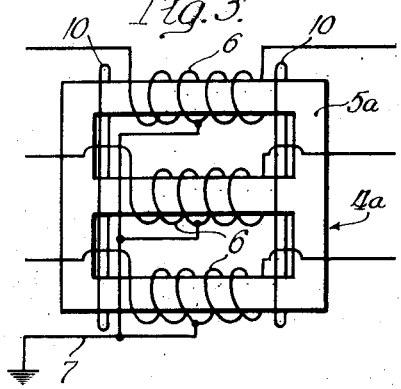
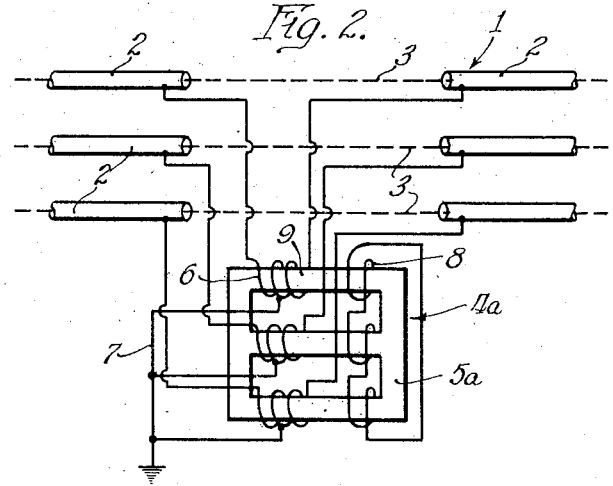
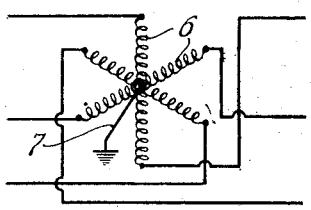
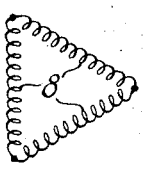
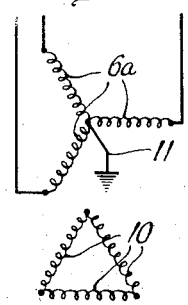
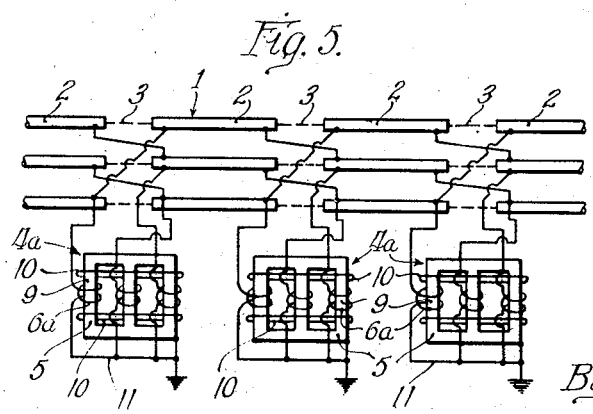
Inventors:
Herman Halperin
Kenneth W. Miller
By Brown Bortner &
Dunner
Atty's.

Patented June 9, 1931

1,809,591

UNITED STATES PATENT OFFICE

HERMAN HALPERIN AND KENNETH W. MILLER, OF CHICAGO, ILLINOIS

SHEATH BONDING AND METHOD

Application filed November 30, 1927. Serial No. 236,634.

Our invention relates to a sheath bonding transformer and method, and more particularly to a method and means of bonding together the sheaths ordinarily placed on the underground cables used in three phase transmission work.

It was formerly the practice in the underground three-phase transmission of alternating currents to place the three conductors in a single cable but as the values of the voltages and currents increase, in accordance with modern practice, this often becomes impracticable. This resulted in the adoption of a method in which the conductors are placed in separate cables, which are placed in suitable conduits under ground. These cables are arranged substantially parallel and, of necessity, are not placed very far apart. In this arrangement several very serious objections arise, due to induced sheath voltages or currents.

When alternating currents flow in the conductors of single conductor cables, there is induced a voltage in each sheath, and this voltage is directly proportional to the current and the length of each section of cable between the manholes. If the sheaths of the three cables are connected by the ordinary method, which is solid bonding in each manhole, then this induced voltage causes a large current to flow in the sheath, with resultant heat losses that considerably reduce the current carrying capacity of the cable; for instance, about twenty per cent on a single-conductor 66-K. V. cable. If, however, the sheath lengths are made discontinuous by insulating joints and are specially connected by bonds or impedances, the flow of current may be prevented in the sheaths or greatly restricted, and the sheath losses practically eliminated. In this case the induced sheath voltages are not consumed in producing sheath current and are therefore present on the sheath. Various methods have been proposed for connecting the discontinuous lengths of sheaths, some of which will be discussed. None of these methods have proved to be entirely satisfactory, all being open to several serious objections.

One of the methods referred to is known as the cross-bonding method. This is, in effect, simply sheath transposition. In practice it has several disadvantages. It does not lend itself readily to irregular conduit lengths, such as exist particularly around stations. Normal sheath voltages to ground at the intermediate portions of a three-length unit are the full amount which is induced in one sheath and the corrosive effects of A. C. electrolysis on the lead sheath may be excessive. During short circuits, these induced voltages increase in proportion to the current, and may reach large values. Also serious difficulties may be introduced into the location of faults by electrical methods, the electrical "signal" being transposed between cables and "carried by" the fault.

A second proposed method with which we are familiar employs single-phase iron-core reactors in series with the sheaths of single-conductor cables. In this case the circuit of the iron core is not closed. This is open to the objection that, during short circuits, when the current flowing would be several times normal, the voltage across the reactor would be correspondingly higher.

In a third method, which is an improvement of the second method above discussed, a single-phase iron-core reactor is connected in series with the sheaths of single-conductor cables and is grounded. In this third method, however, the core of the reactor is designed with a closed iron circuit so proportioned as to approach magnetic saturation under normal conditions. As a result, during flow of abnormal currents such as occur during short circuits, the core becomes saturated permitting a large amount of current to flow through the reactor thus limiting the voltage across the reactor, this voltage usually being about three times normal value. This eliminates, to a large extent, the possibility of dangerously high voltages existing on the cable sheaths, which might cause holes to be burned in the sheath of the cable or shock a workman touching the sheath. In connection with the second and third methods, the reactor coil may be grounded at its midpoint thus reducing the normal operating sheath voltage to ground to one-half the total amount induced in the sheath of one cable length. This reduces by at least fifty per cent the danger of trouble from A. C. electrolysis effects.

While this third method is an improvement over the first and second methods above discussed, it is open to several objections, the most serious of which is that during the flow of failure currents returning back to the station through the lead sheaths and reactors, the coil voltages are added in series to the voltage drop along the sheath, and the resultant voltages are unnecessarily large. Also during normal operation and failures, due to the single phase arrangement of reactance coils having iron cores, triple harmonic currents are introduced into the sheath circuit which may produce objectionable inductive interference with telephone and like circuits. A further objection is the necessity of providing a separate reactor for each phase and the coils of these reactors are rather large and expensive both of which factors add very materially to the cost of this method.

In order to reduce the objectionable features of the third method we invented a three coil reactor described in our patent application Serial 224,339, filed October 6, 1927, patented July 16, 1929, No. 1,721,018, having its magnetic circuit interlinked on a common core member and the coils so connected as to operate normally as a three phase reactor. With this three coil reactor, during the flow of single phase failure current the magnetic fluxes in the iron core members would be in opposition. Hence in comparison with the second and third methods the abnormal coil voltages would be only the reactive drop due to the leakage flux instead of saturation flux which exists in the other two methods and the improvement in limitation of excessive sheath voltages would be considerable.

In the construction of a reactor which is practical for field conditions such as in a manhole containing water it is very desirable to immerse the device in compound and enclose it in a case to protect the iron core from excessive rusting, the terminals from corrosion, and the insulation from wetting. For several practical reasons such a case is constructed of steel or iron, which are magnetic materials.

Since during failure conditions the three coil flux opposition reactor of our previous invention virtually behaved as a straight bar magnet wound with a single A. C. coil, the iron case would act as a return path for the leakage flux and would greatly reduce the reluctance of the magnetic circuit from one end of the iron core to the other. The leakage flux would be greatly increased by the iron case and the coil voltages would be correspondingly increased reducing to some extent the advantages of our previous invention.

In order to avoid these objections and also to obtain other improvements in operation, we have invented a three coil sheath bonding transformer.

We have found that the above noted objections can be avoided by the addition of a secondary winding properly connected. As before the several primary or reactance coils, which are connected to the sheaths of the cables, act in flux opposition in a three phase core during a line failure. In addition, the secondary winding, by transformer action, results in very low impedance to the flow of the returning single phase failure current through the three sheaths in parallel. The secondary winding also prevents stray magnetic flux reaching the iron case. This winding eliminates the introduction of triple harmonic currents into the sheath circuit. By using a single transformer the cost of installation, as well as the cost of the transformer used, is greatly reduced as compared to the second and third methods above discussed. Further objects and advantages of our invention will appear from the detail description.

In the drawings:—

Figure 1 is a diagrammatic view of our invention showing the primary coils of the transformers connected in series with the sheaths of the respective cables, the secondary coils being connected in a closed delta;

Figure 2 is a view similar to Figure 1 of a modified form of our invention;

Figure 3 is a diagrammatic view of a second modified form of our invention;

Figure 4 is a diagram of the connections of the primary and secondary transformer coils in the forms illustrated in Figures 1, 2 and 3;

Figure 5 is a diagrammatic view of a third modified form of our invention, the cable sheaths being transposed; and Figure 6 is a diagram of the connections of the coils in the form of Figure 5.

In Figure 1 of the drawings each of the cables 1 is provided with a sheath 2 usually of lead or lead alloy. This sheath is divided into sections or lengths by insulated joints 3, of known type, the joints interrupting the electrical continuity of the sheath. Usually, each sheath section extends from one manhole to another, the insulated joints being located in the man-holes as is customary, though these joints may also be located at other points, if required.

In accordance with our invention we employ a device by the reactance and transformer characteristics of which we control the sheath voltage. This device may assume different forms. In Fig. 1 we have shown individual transformers 4 for the respective cables. Each of these transformers has a closed core member 5 on one arm of which is mounted the primary coil 6 the ends of which are connected to the sheath lengths at opposite ends of the joint 3. These primary coils may be grounded at their mid-point by a common ground wire 7. Under certain unusual circumstances it may be advisable not to interconnect or ground the mid-points. A secondary coil 8 is mounted on the other arm of the core member 5 and the secondary coils of the several transformers are connected in series with each other to form a closed circuit. The secondaries are in "delta" connection, and the primaries of the transformers, when their mid-points are grounded, form a double "star" connection as illustrated symbolically in Fig. 4.

The arrangement illustrated in Fig. 2 is similar to that of Fig. 1, with the exception that the transformer 4a comprises a single core member 5a having core elements 9 each of which receives a primary coil 6 and its associated secondary coil 8. The core member, in this form, is common to all of the coils.

In the modified form illustrated in Fig. 3, the construction is very similar to that of Fig. 2, but the secondary coils 8 have been replaced by single closed coils 10 extending completely about the core member 5a at each end thereof. This form is simpler mechanically than that of Fig. 2 and possesses advantages which will be discussed further on. The diagram of Fig. 4 illustrates the connections of the coils of Figs. 2 and 3, also as well as of Fig. 1.

The form of transformer illustrated in Fig. 3 is used in the method of Fig. 5. In the method of this figure, the cable sheath lengths 2 are transposed by cross-bonding, as illustrated, the primary coils 6a are grounded at only one end by a common wire 11, and the other end of each coil is connected to a cable sheath length 2. In this form the primary coils 6a are connected in "star" and the secondary coils 10 may be considered as connected in "delta", as illustrated symbolically in the diagram of Fig. 6.

If three single phase transformers are connected across the insulating sleeves in the cable sheath circuit as shown in Fig. 1 and the secondaries of the transformers are connected in delta, then the equivalent electrical circuit is shown in Figure 4 in the symbolic form familiar to the art. It is evident that during normal operation, three phase sheath voltages are applied to the transformer primaries and the vector summation of the voltages in the delta connected secondaries is zero. Therefore during normal operation no current will flow in the secondary windings and the current flow in the primary coils will be limited to exciting current necessary to establish the flux which is required to cause an induced voltage equal and opposite the applied or sheath voltage. As is well known this exciting current is small. It can easily be seen that the normal operation of our present invention is identical to that of an ordinary three phase transformer bank with no load on the delta connected secondary.

During failures either one or both of two different effects may be produced. First, the conductor currents may become unbalanced due to the current flowing out to the failure and as a result the induced sheath voltages applied to the transformers become increased in magnitude and distorted in phase. Secondly, the returning failure current will return to the station end of the line all or in part over the sheaths of the cables and through the primary coils of the bonding transformers.

It is well known that the voltage induced in the secondary of a transformer is almost exactly proportional to the voltage applied to the primary. Now the applied voltages which are induced in the cable sheaths by currents in the copper conductors are directly proportional to the conductor currents. Therefore, if during failure the vector summation of conductor currents is not zero, then the vector summation of voltages induced in the delta connected secondaries of the transformers is not zero and the secondary acts as a short circuited winding for that amount of voltage by which the vector triangle fails to close. Since the short circuit impedance of a transformer can be made very low, the impedance drop for the unbalanced component of the sheath voltage will be very low and large induced currents will flow in the sheaths. These currents will consume the unbalanced component of induced voltage in the sheaths and neutralize it where it is generated. If the mid taps of the coils are connected to earth, an auxiliary cable, or other cable sheaths this unbalanced voltage will be nearly totally consumed. If the circuit is entirely isolated the unbalanced induced voltage will be averaged to ⅓ value per cable and it is theoretically impossible for any device without external connection to do more.

If the vector summation of the conductor currents during failure is zero, or for that portion of the conductor currents whose vector sum is zero, it may be shown by similar reasoning that the vector sum of voltages in the secondaries is zero and no current will be induced in the secondaries. Except for normal operation (which is a special case of the vector summation of conductor currents equal to zero), a short circuit between two or three conductors is the only abnormal condition which could result in no current flow in the transformer secondaries. But for this condition the abnormal induced voltage is only between cable sheaths (and to ground). The vector sum of voltages induced in the three sheaths is zero and since the coil mid taps are interconnected at every manhole the cumulative voltage along the line from this effect is zero.

Normal sheath voltage at full load is usually about 10 volts per cable length and short circuit currents seldom exceed 10 times normal full load value so that a voltage of 50 to 100 volts between cable sheaths and ground would seldom be exceeded. Temporary sheath voltages of this value are harmless and inconsiderable in comparison with cumulative voltages along the cable sheath circuit which could result from the vector resultant of unbalanced copper currents already described or returning failure current about to be described. Moreover failures between phases not involving failure to ground are not frequent and in many cases are impossible on single conductor cable lines.

The returning failure current is most important from the standpoint of sheath voltages during abnormal conditions. Single conductor cable lines are often installed in isolated conduits which may be quite dry. The failure current is forced to return long distances toward the terminal station over the cable sheaths of the line in trouble and through the sheath bonding devices which add their voltages in series to the sheath impedance drop. Since this voltage is cumulative along the line it is very important that the transformer coils present a small impedance to such return currents.

Necessarily the return current from one, or more, failures must be single phase in resultant value. It has been found that this current will return about equally divided in the three cable sheaths (except for the cable length containing the failure). But however divided between the cable sheaths it can be seen in Figure 1 that the transformers are equivalent to three single phase current transformers with primaries in parallel and secondaries in series and since the secondaries are connected in closed circuit large currents will flow in the secondary circuit. Therefore for such returning failure current the transformers behave like shorted current transformers and present very low impedance to the returning failure current and cause very small voltage drops.

Thus it can be seen that such a transformer connection in the sheath circuit as is shown in Figure 1 will prevent the flow of large three phase sheath currents during normal operation but will permit returning failure current to pass in either direction practically without obstruction and furthermore it will act as a short circuit to any directional or cumulative induced sheath voltage. Otherwise stated the combination acts as a directional valve allowing heavy currents to pass for abnormal conditions but preventing appreciable current flow during the normal operation.

Also, as is well known, triple harmonic exciting current can flow in the delta connected secondary and therefore will not be present in the sheath circuit where it might give trouble from inductive interference on telephone cables in parallel conduits. Since all these effects are exactly those desired in operation, the transformer combination is ideal for the purpose of sheath bonding.

It is obvious that the scheme is applicable to single phase, two, four or six phase circuits or in fact any circuit with two or more cables and in the above description and in the following claims, we do not intend to limit ourselves to the most common three phase arrangements shown.

It can easily be seen that a three coil transformer can be used for the same purpose with primary and secondary windings connected as shown in Figure 2. With this arrangement the conventional diagram is represented as before by Figure 4 and the operation of the device under normal and abnormal conditions is almost exactly the same as described for the connection shown in Figure 1. The arrangement shown in Figure 2 is preferable to that shown in Figure 1 for mechanical reasons such as saving of material, convenience in enclosing in a case, bringing out terminal connections, etc. It is electrically superior to the arrangement shown in Figure 1 because with both primary and secondary windings on the same core leg very little flux leakage can occur between windings or escape to the iron case or iron clamping bolts as is possible with the single phase transformers.

In order to withstand the large temporary currents which may flow during failures it is necessary to use copper of large cross section for the coils. For thermal and electrical reasons it is advisable to make the total cross section of the secondary winding about the same as the primary.

An inspection of the direction of flux produced individually in the three legs of the three phase core shown in Figure 2 by an identical current flowing in the three secondary coils "8" will indicate that a single turn or heavy copper bar around all three core legs is electrically equivalent to three individual coils and is much better from a mechanical and cost standpoint. Two such secondary coils or rings "10" may be placed one at each end of the three phase core as shown in Figure 3 and we have found that such an arrangement is electrically equivalent to those shown in Figures 1 and 2. The slight increase in flux leakage is unimportant compared to the practical advantages obtained. It is entirely feasible to place the secondary turn around the center of the three core legs, to wind it over all three primary coils, or to use various combinations of these arrangements, and we do not limit ourselves to the preferred form indicated in Figure 3.

In Figure 5 we illustrate another connection utilizing a modification of our three coil sheath bonding transformer. In this method the cable sheaths are transposed at every set of insulating joints by cross bonds and the transformer primaries are star connected to the three cable sheaths at any convenient locations and the common point is grounded and/or connected to other cable sheaths if such grounds are available. We have found, and it may be shown theoretically, that such a connection will behave in an analogous manner to the methods of connection shown in Figures 1, 2 and 3. In this method the normal sheath voltage to ground is fifteen percent higher than with the other straight series connections but it has several advantages. The transformer need not be connected at the insulating joint nor even at every insulating joint. A minimum of series impedance is presented to returning failure current while the directional properties of the transformer present very low impedance for the failure current to be drained off of the three sheaths in parallel to ground should there exist a parallel path of low impedance back to the end of the line.

In the form illustrated in Fig. 5, considered in its broader aspects, the coils 6a may be considered as resistances or current limiting means rather than as reactances. The common connection between the lower ends of these coils constitutes an artificial neutral point which is preferably grounded though under certain conditions grounding of this point may be omitted. Connecting the coils in this manner and transposing the sheaths gives a very satisfactory arrangement and gratifying results. In practice the primary coils 6a in Figures 5 and 6 may be replaced by resistances or impedances though as a general rule we prefer the use of the transformer illustrated in Figure 5 because of its better electrical properties.

We are aware of the French Patent 517,446, dated June 1920 which discloses a sheath bonding transformer for single conductor cables. In this patent the transformers are single phase with one winding connected across the insulating joint. The other winding consists of one turn namely the cable conductor itself. This necessitates placing the transformer inside the joint itself. In our invention we substitute for the conductor a winding which is interconnected with the sheaths of the other two cables in such a manner that the voltage induced by double transformation is exactly equivalent to that which would be produced by the conductor itself. It is well known that the vector sum of currents in phases B and C for example, is equal and opposite to that of phase A and since the induced sheath voltages are exactly proportional to these conductor currents their effect on the primary of transformer A as relayed through the secondary windings is exactly equivalent to magnetically coupling to the conductor itself.

The chief merit of our invention in advance of that disclosed by the French patent referred to is the ability to remove the transformer out of the joint case, greatly simplifying the joint design, and by three phase connections and constructions, obtaining in addition all the electrical and mechanical advantages already described. The air gap used in the above mentioned French patent is unnecessary and undesirable for our purposes.

In the design of the magnetic circuit for practical reasons it is desirable to proportion the transformer cores to operate near the saturation point in order to keep the amount of iron used at a minimum as is customary in usual transformer design. This will also allow the return failure currents to more readily equalize themselves in the transformers near the failure. However, the flux density is not a matter vital to the operation of our device and we do not limit ourselves to any particular flux density.

We claim :—

1. In combination with the cable sheaths of a multiphase transmission system, the sheaths of said cables being separated into lengths electrically insulated from each other, a transformer having its primary coils bridging the gaps between the sheath lengths, the secondary coils of the transformer being connected in delta.

2. In combination with the cable sheaths of a multiphase transmission system, the sheaths of said cables being separated into lengths electrically insulated from each other, a three phase transformer having its primary coils bridging the gaps between the sheath lengths, and connected to act in opposition during abnormal operation, the secondary coils of the transformer being connected in delta.

3. In combination with the cable sheaths of a multiphase transmission system, the sheaths of said cables being separated into lengths electrically insulated from each other, a transformer having its primary coils bridging the gaps between the sheath lengths, the secondary coils of the transformer being connected to each other and forming a closed circuit.

4. In combination with the cable sheaths of a multiphase transmission system, the sheaths of said cables being separated into lengths electrically insulated from each other, a three phase transformer having its primary coils bridging the gaps between the sheath lengths, said transformer having at least one secondary coil and the terminals of said secondary coil being short circuited providing a closed circuit for the secondary current.

5. In combination with the cable sheaths of a multiphase transmission system, the sheaths of said cables being separated into lengths electrically insulated from each other, a transformer having its primary coils bridging the gaps between the sheath lengths and grounded, the secondary coils being connected in a closed circuit.

6. In combination with the cable sheaths of a multiphase transmission system, the sheaths of said cables being separated into lengths electrically insulated from each other, a transformer having its primary coils bridging the gaps between the sheath lengths and grounded at their mid-points, the secondary coils being connected in delta.

7. In combination with the cable sheaths of a multiphase transmission system, the sheaths of said cables being separated into lengths electrically insulated from each other, a transformer having its primary coils bridging the gaps between the sheath lengths and grounded, said primary coils having star connection with each other and the sheath lengths, the secondary coils of the transformer being connected in delta.

8. In combination with the cable sheaths of a multiphase transmission system, the sheaths of said cables being separated into lengths electrically insulated from each other, a transformer having its primary coils bridging the gaps between the sheath lengths and grounded at their mid-points, said primary coils having star connections with each other and the sheath lengths, the secondary coils of the transformer being connected in delta.

9. In a polyphase system, separate sheathed cables for the respective phases, each sheath divided into a plurality of short sections insulated from one another, high reactance means connecting the respective sections of the cables to ground, and means effective upon the occurrence of an unbalanced condition between the respective sheaths for reducing the reactance of said first means to a negligible value.

10. In a three phase system, three separate sheathed cables, one for each phase, each of the cable sheaths being divided into sections insulated from one another, electromagnetic means for electromagnetically interlinking the sheath circuits, and means ineffective during normal operation and initially effective upon the occurrence of unbalanced conditions in the respective sheath circuits for appreciably reducing the impedance of the electromagnetic means.

11. In a three phase system, three separate sheathed cables, one for each phase, each of the cable sheaths being divided into sections insulated from one another, electromagnetic means for electromagnetically interlinking the sheath circuits, said means comprising coils conductively interconnected, and means ineffective during normal operation and initially effective upon the occurrence of unbalanced conditions in the respective sheath circuits for appreciably reducing the impedance of the electromagnetic means.

12. In a three phase system, three separate sheathed cables, one for each phase, each of the cable sheaths being divided into sections insulated from each other, means having a comparatively high reactance under normal conditions for interconnecting the sheaths, and means effective upon the occurrence of an unbalanced condition between the respective sheaths for reducing the reactance of said means to a negligible value.

13. In a polyphase transmission system wherein there are provided separate sheathed cables for the respective phases, the sheath of each cable being divided into sections insulated from one another and interconnected by means having a relatively high impedance, the method of controlling the sheath current upon the occurrence of a fault, which comprises reducing the high impedance to a low value upon the occurrence of a fault.

14. In a polyphase transmission system wherein there are provided separate sheathed cables for the respective phases, the sheath of each cable being divided into sections insulated from one another, the method of controlling the sheath current which comprises forcing the sheath currents to divide between the sheaths of the cables during abnormal conditions, and substantially preventing such division of current during normal operating conditions.

In witness whereof, we hereunto subscribe our names this 28 day of November, 1927.

HERMAN HALPERIN.
KENNETH W. MILLER.